United States Patent
Juergens et al.

(10) Patent No.: US 8,845,803 B2
(45) Date of Patent: Sep. 30, 2014

(54) METHOD FOR THE SURFACE TREATMENT OF INORGANIC PIGMENT PARTICLES

(71) Applicants: Volker Juergens, Kirchhundem (DE);
Alexander Breyder, Leverkusen (DE);
Frank Mersch, Leichlingen (DE);
Siegfried Bluemel, Ratingen (DE);
Volker Schmitt, Leichlingen (DE)

(72) Inventors: Volker Juergens, Kirchhundem (DE);
Alexander Breyder, Leverkusen (DE);
Frank Mersch, Leichlingen (DE);
Siegfried Bluemel, Ratingen (DE);
Volker Schmitt, Leichlingen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 13/930,100

(22) Filed: Jun. 28, 2013

(65) Prior Publication Data

US 2014/0000483 A1    Jan. 2, 2014

Related U.S. Application Data

(60) Provisional application No. 61/677,117, filed on Jul. 30, 2012.

(30) Foreign Application Priority Data

Jun. 29, 2012 (DE) .......................... 10 2012 012 931
Jun. 5, 2013 (DE) .......................... 10 2013 009 390

(51) Int. Cl.
    *C09C 3/06*     (2006.01)
    *C09C 1/36*     (2006.01)
    *D21H 27/28*    (2006.01)
    *D21H 21/28*    (2006.01)

(52) U.S. Cl.
    CPC ................ *C09C 1/3653* (2013.01); *C09C 3/06* (2013.01); *C01P 2004/62* (2013.01); *C01P 2006/12* (2013.01); *C09C 1/3661* (2013.01); *C01P 2004/04* (2013.01); *C09C 3/063* (2013.01); *C01P 2006/62* (2013.01); *C01P 2006/60* (2013.01); *C01P 2004/64* (2013.01); *D21H 27/28* (2013.01); *D21H 21/28* (2013.01)
    USPC ............ 106/443; 106/442; 427/218; 524/413

(58) Field of Classification Search
    USPC ................... 106/442, 443; 427/218; 524/413
    See application file for complete search history.

(56) References Cited

U.S. PATENT DOCUMENTS

| | | | | |
|---|---|---|---|---|
| 3,552,995 | A | * | 1/1971 | Powell ......................... 106/437 |
| 3,591,398 | A | | 7/1971 | Angerman |
| 3,859,115 | A | * | 1/1975 | Wiseman et al. ............ 106/430 |
| 3,926,660 | A | * | 12/1975 | Holle et al. .................. 106/430 |
| 3,981,737 | A | * | 9/1976 | Evilampi et al. ............. 106/425 |
| 4,052,224 | A | * | 10/1977 | Howard ........................ 106/438 |
| 4,075,031 | A | | 2/1978 | Allen |
| 4,744,832 | A | * | 5/1988 | Franz et al. ................... 106/418 |
| 5,215,580 | A | * | 6/1993 | Elfenthal et al. ............. 106/441 |
| 5,451,252 | A | * | 9/1995 | Elfenthal et al. ............. 106/436 |
| 6,045,914 | A | * | 4/2000 | Sullivan et al. .............. 428/404 |
| 6,143,064 | A | * | 11/2000 | Virtanen ....................... 106/449 |
| 6,695,906 | B2 | * | 2/2004 | Hiew et al. .................... 106/446 |
| 6,740,312 | B2 | * | 5/2004 | Chopin et al. .................. 424/59 |
| 6,962,622 | B2 | * | 11/2005 | Bender et al. ................ 106/442 |
| 7,264,672 | B1 | * | 9/2007 | Trabzuni et al. ............. 106/443 |
| 7,285,162 | B2 | * | 10/2007 | Hua et al. ...................... 106/436 |
| 7,288,146 | B1 | * | 10/2007 | Nicolai et al. ................ 106/443 |
| 7,686,882 | B2 | * | 3/2010 | Hua et al. ...................... 106/433 |
| 7,758,690 | B2 | * | 7/2010 | Nutbeem et al. ............. 106/486 |
| 2009/0297852 | A1 | * | 12/2009 | Frahm et al. .................. 428/403 |
| 2012/0247702 | A1 | * | 10/2012 | Jurgens et al. ............. 162/181.5 |

FOREIGN PATENT DOCUMENTS

| | | | |
|---|---|---|---|
| DE | 26 29 953 A1 | 2/1977 | |
| DE | 10332650 | 2/2005 | |
| DE | 102006012564 | 3/2006 | |
| DE | 10 2011 015 856 A1 | 10/2012 | |
| DE | 102011015856 | 10/2012 | |
| EP | 0499863 | 2/1992 | |
| EP | 0579062 | 7/1993 | |
| JP | 52-109531 A * | 9/1977 | .............. C09D 7/00 |
| WO | WO99/35193 | 7/1999 | |
| WO | WO 02/077107 | 10/2002 | |

OTHER PUBLICATIONS

Derwent-Acc-No. 2005-165792, abstract of German Patent Specification No. DE 10332650 A1 (Feb. 2005).*

* cited by examiner

*Primary Examiner* — Anthony J Green
(74) *Attorney, Agent, or Firm* — Locke Lord LLP

(57) ABSTRACT

The invention relates to a method for the surface treatment of inorganic pigment particles with agglomerates of fine primary particles or single crystals of inorganic compounds, particularly of oxides or sulphates. The method is characterized in that the inorganic compounds are first precipitated from an aqueous solution under suitable pH conditions in a separate vessel in the form of fluffily structured agglomerates and/or single crystals. The precipitation product is subsequently added to an aqueous suspension of inorganic pigment particles. The method is particularly suitable for the surface treatment of titanium dioxide particles, in order to achieve high hiding power or high opacity when used in emulsion paints or laminates.

8 Claims, 5 Drawing Sheets

METHOD FOR THE SURFACE TREATMENT OF INORGANIC PIGMENT PARTICLES

RELATED APPLICATIONS

This application claims the benefit of U.S. Provisional Patent Application Ser. No. 61/677,117 filed Jul. 30, 2012, and entitled "Method for Surface Treatment of a Titanium Dioxide Pigment" and the benefit of DE 10 2012 012 931.9 filed Jun. 29, 2012 and DE 10 2013 009 390.2 filed Jun. 5, 2013.

BACKGROUND

1. Field of the Invention

The invention relates to a method for the surface treatment of inorganic pigment particles, particularly titanium dioxide pigment particles, and use of the pigment particles in laminates, coatings and plastics.

2. Description of Related Art

Inorganic particles, particularly inorganic pigment particles, are often surface-treated in order to modify certain properties, such as surface charge, dispersing properties, acid resistance or light-fastness. When using pigments, particularly titanium dioxide, it is important, among other things, to achieve high hiding power (opacity), which can be improved by a special type of surface treatment. High hiding power or opacity is required when using the titanium dioxide pigment particles in emulsion paints or laminates (decorative laminating paper), for example.

Elevated hiding power is customarily obtained by surface treatment with silicon oxide and/or aluminum oxide, which has a structure that is as fluffy, porous and voluminous as possible and acts as a spacer for the individual pigment particles. Alternatively, the pigment particles can be mixed with suitable extenders (e.g. calcium carbonate, kaolin, talcum), in which case the extender particles are likewise intended to serve as spacers for the pigment particles.

U.S. Pat. No. 3,591,398 and U.S. Pat. No. 4,075,031 disclose methods for precipitating porous $SiO_2$ and $Al_2O_3$ coatings onto $TiO_2$ particles, in order to improve the hiding power of the pigment particles. In this context, alkaline precursors of the coating oxides are added to an acid, aqueous suspension of the $TiO_2$ particles displaying a pH value of ≤7, and the corresponding oxides are rapidly precipitated out in a fluffy structure.

Decorative laminating paper forms part of a decorative, thermosetting coating material, used with preference for finishing furniture surfaces and for laminate flooring. Laminates is the term used to denote materials in which, for example, several impregnated, stacked layers of paper, or paper and hardboard or particle board, are pressed together. The use of special synthetic resins achieves extraordinarily high resistance of the laminates to marring, impact, chemicals and heat.

The use of special-purpose papers (decorative laminating papers) permits the production of decorative surfaces, where the decorative laminating paper serves not only as facing paper, e.g. to hide unattractive wood material surfaces, but also as a carrier for the synthetic resin.

The demands imposed on decorative laminating paper include, among others, opacity (hiding power), light-fastness (greying resistance), color-fastness, wet strength, suitability for impregnation and printability. The cost-effectiveness of the decorative laminating paper production process is determined by the opacity of the pigment in the paper, among other things.

In principle, a pigment based on titanium dioxide is eminently suitable for achieving the necessary opacity of the decorative laminating paper. During paper manufacture, a titanium dioxide pigment, or a titanium dioxide pigment suspension, is usually mixed with a pulp suspension. In addition to pigment and pulp as the feedstock, use is generally also made of auxiliaries, such as wet-strength agents, and further additives, such as certain fillers, where appropriate.

To improve the light-fastness (greying resistance) of decorative laminating paper, the titanium dioxide pigment is customarily coated with aluminum compounds, particularly with aluminum phosphate. Special surface treatments for improving the opacity of the titanium dioxide pigments when used in decorative laminating paper and other applications are likewise known, such as the precipitation of high-volume metal oxide layers on pigments for emulsion paints, where the precipitate acts as a spacer for the individual pigment particles.

According to DE 103 32 650 A1, it is possible to manufacture a titanium dioxide pigment with high greying resistance that simultaneously displays improved retention and opacity. The method is characterized in that an aluminum component and a phosphorus component are added to a titanium dioxide suspension at a constantly maintained pH value of at least 10, after which the pH value is reduced to below 9 in order to precipitate aluminum phosphate compounds.

DE 10 2011 015 856 A1 describes a further method for manufacturing an aluminum phosphate-coated titanium dioxide pigment with high greying resistance and good brightness and opacity. In this method, phosphoric acid is first added to the titanium dioxide suspension, followed by an alkaline and an acid aluminum compound.

WO 2002/077107 A2 discloses a titanium dioxide pigment composition displaying both high greying resistance and high opacity. The pigment composition consists of a blend of two different titanium dioxide pigment types. Type A is a titanium dioxide pigment with high greying resistance suitable for use in decorative laminating paper, e.g. coated with aluminum phosphate, and Type B is a titanium dioxide pigment suitable for use in emulsion paints that is characterized by coating with an elevated $SiO_2$ and $Al_2O_3$ content precipitated in flaky, high-volume form. This composition has the disadvantage that two different pigment types first have to be produced and subsequently blended homogeneously.

There is a need for a method for manufacturing inorganic pigments that display advantages compared to known inorganic pigments, e.g. in the form of higher efficiency and cost savings that can be achieved in use as a result. There is especially a need for an alternative, economical method for manufacturing a titanium dioxide pigment with improved opacity and the possibility of simultaneously also optimizing other properties, such as weather resistance, greying resistance, brightness, corrosion resistance, etc.

BRIEF DESCRIPTION OF THE INVENTION

The object of the invention is to provide an alternative method for the surface treatment of inorganic pigment particles, particularly of titanium dioxide pigment particles, with the help of which the opacity and/or other properties, e.g. the weather resistance or brightness, of the pigment particles can be improved.

The object is solved by a method for the surface treatment of inorganic pigment particles that is characterised by the following steps:

a) Provision of an aqueous suspension of inorganic pigment particles, b) Precipitation of inorganic compounds from aqueous solution in a separate vessel, where the precipitation product consists of agglomerates of fine primary particles and/or of single crystals, c) Addition of said precipitation product to the aqueous suspension of inorganic pigment particles.

Further advantageous versions of the method are described in the sub-claims.

BRIEF DESCRIPTION OF THE DRAWING

For a more complete understanding of the present invention and for further advantages thereof, reference is now made to the following description taken in conjunction with the accompanying drawings in which.

DESCRIPTION OF THE PREFERRED EMBODIMENTS

Figure 1:
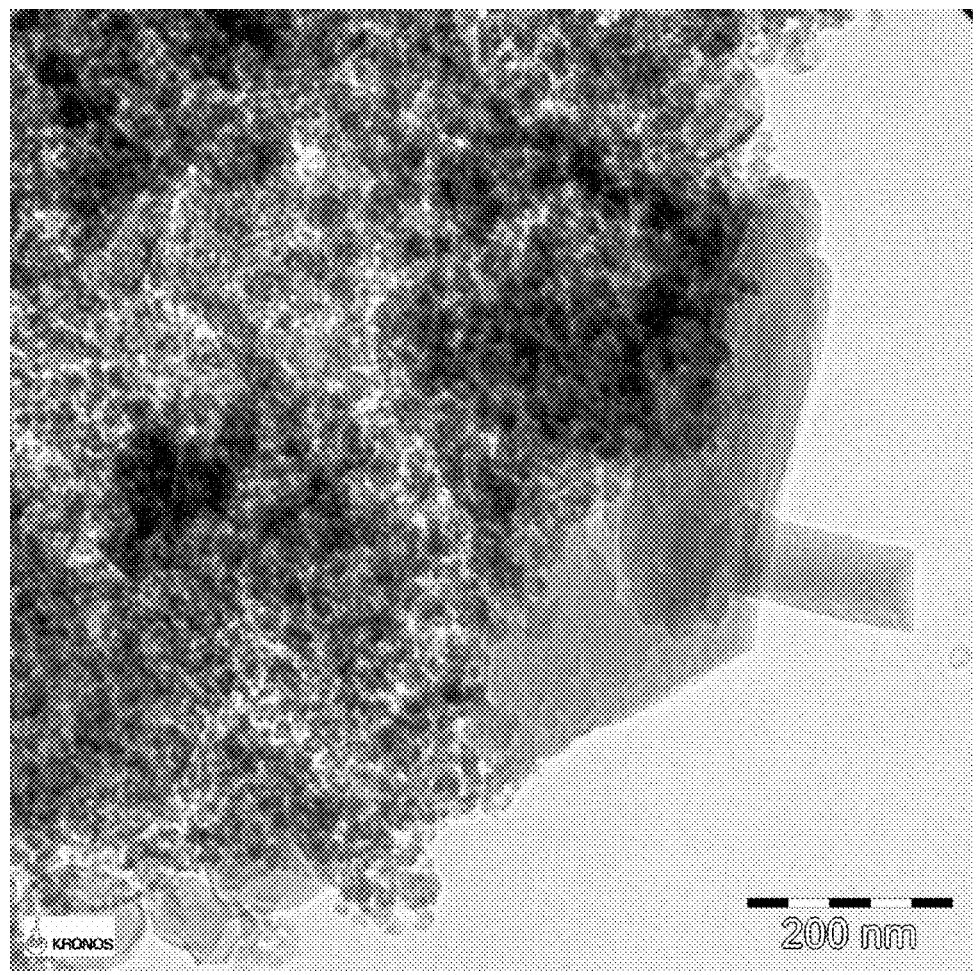
FIGS. 1a and 1b show transmission electron microscope (TEM) images of the precipitation product according to the invention, produced in accordance with Example 1.
Figure 1:
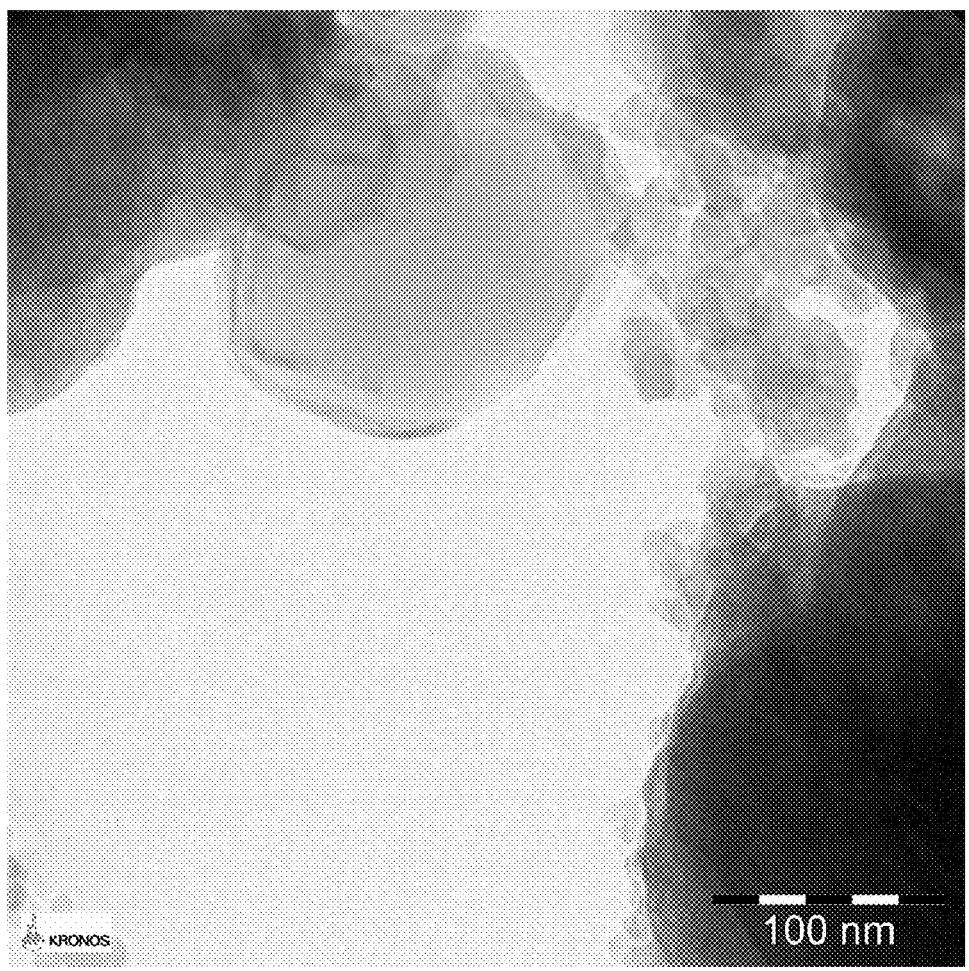

Here and below, the term "oxide" is to be taken to also mean the corresponding hydrous oxides, hydroxides or hydrated oxides. All data disclosed below regarding pH value, temperature, concentration in % by weight or % by volume, particle size, etc. are to be interpreted as including all values lying in the range of the respective measuring accuracy known to the person skilled in the art. When used in the context of the present patent, the term "significant quantity" or "significant content" indicates the minimum quantity of a component, upwards of which the properties of the mixture are affected in the framework of the measuring accuracy.

The inorganic pigment particles used according to the invention preferably have a maximum mean particle diameter of about 1 μm, particularly of about 0.1 to 1 μm and particularly preferably of about 0.2 to 0.5 μm.

Suitable pigment particles include inorganic color pigment and white pigment particles. Titanium dioxide pigment particles are particularly preferred.

The invention is based on an aqueous suspension of inorganic pigment particles. The particles can previously have been subjected to milling, e.g. in an agitator mill. The particles can moreover already have been provided with a surface coating, e.g. of inorganic metal oxides.

In the case of titanium dioxide pigment particles, material produced by either the chloride process or the sulphate process can be used. The titanium dioxide particles are preferably aluminum-doped. The level of aluminum doping is preferably in the region of 0.2 to 2.0% by weight, calculated as $Al_2O_3$. The titanium dioxide particles used can be either untreated (titanium dioxide base material) or already surface-coated. The surface coating can consist of one or more layers. The coating customarily contains one or more of the compounds $SiO_2$, $Al_2O_3$, $ZrO_2$, $TiO_2$, $SnO_2$, $P_2O_5$. The person skilled in the art is familiar with the customary compositions and the customary procedures for producing the coating. In particular, the coating layers can display a dense and/or a fluffy structure.

According to the invention, a precipitation product of inorganic compounds, consisting of agglomerates of fine primary particles and/or of single crystals, is added to the aqueous suspension of inorganic pigment particles. The precipitation product preferably contains oxides or sulphates. The oxides are particularly silicon, aluminum, zirconium or titanium oxide, or mixtures thereof. The fine primary particles preferably display a size of up to 200 nm, particularly up to 100 nm and particularly preferably up to 50 nm, in one dimension. In a further embodiment of the invention, the primary particles are predominantly crystalline. The single crystals in the precipitation product preferably display an edge length of up to 3 μm, particularly up to 1 μm.

The precipitated agglomerates of the fine primary particles preferably have a fluffy structure. According to the invention, "fluffy structure" or "fluffily structured aggregates" means that the cavities present between the primary particles are detectable under the electron microscope and account for more than roughly 30% by volume of the agglomerates. The agglomerates are also referred to as flocs below.

The size of the agglomerates is dependent on the precipitation and dispersing conditions, e.g. on pH value, temperature, time and nucleator addition. The person skilled in the art is familiar with the options for influencing the size.

The precipitation product is prepared by mixing at least two components in aqueous solution and appropriate control of the pH value and/or temperature, as a result of which the required inorganic compounds are precipitated. The person skilled in the art is familiar with corresponding components and the appropriate control parameters for precipitation.

Precipitation is performed in a separate vessel, which can, for example, also be a pipeline leading to the vessel containing the suspension of inorganic pigment particles. The pipeline can additionally be equipped with an inline mixer, where appropriate.

In one embodiment of the invention, for example, an aqueous mixed solution of at least two components with a pH value of 4.5 to 7 is provided to precipitate agglomerates of aluminum oxide primary particles. The at least two components comprise either an alkaline aluminum compound (e.g. sodium aluminate) and an acid component, e.g. an acid or an acid-reacting salt (e.g. aluminum sulphate), or they alternatively comprise an acid aluminum compound (e.g. aluminum sulphate) and an alkaline component, e.g. an alkaline solution or an alkaline-reacting salt (e.g. sodium aluminate).

Aluminum oxide is precipitated in fluffily structured agglomerates in the mixed solution.

The components used to precipitate agglomerates of silicon oxide primary particles are, for example, an alkaline alkali silicate solution (e.g. waterglass) and an acid (e.g. $H_2SO_4$ or HCl). $SiO_2$ is known to be precipitated at pH values below roughly 9 to 10.

In a special embodiment of the invention, fluffily structured agglomerates of aluminosilicate primary particles can be produced. In this context, an alkaline silicate solution is mixed with an alkaline aluminum compound (e.g. sodium aluminate) and subsequently or simultaneously set to a pH value of roughly ≤10 with an acid or an acid-reacting component (e.g. aluminum sulphate), in which context $SiO_2$ and $Al_2O_3$ are precipitated together in fluffily structured form. Alternatively, the alkali silicate solution can be mixed with an acid-reacting aluminum compound (e.g. aluminum sulphate) and set to a pH value of roughly ≤10 with a corresponding quantity of acid or alkaline solution.

According to the invention, precipitation products of other oxide mixtures can also be produced.

The precipitation product, prepared in a separate vessel according to the invention, is subsequently added to the pigment particle suspension while stirring, preferably in the form of a suspension. The conditions are selected in such a way that the precipitation product and the pigment particles in the suspension are chemically stable after addition.

Figure 2:
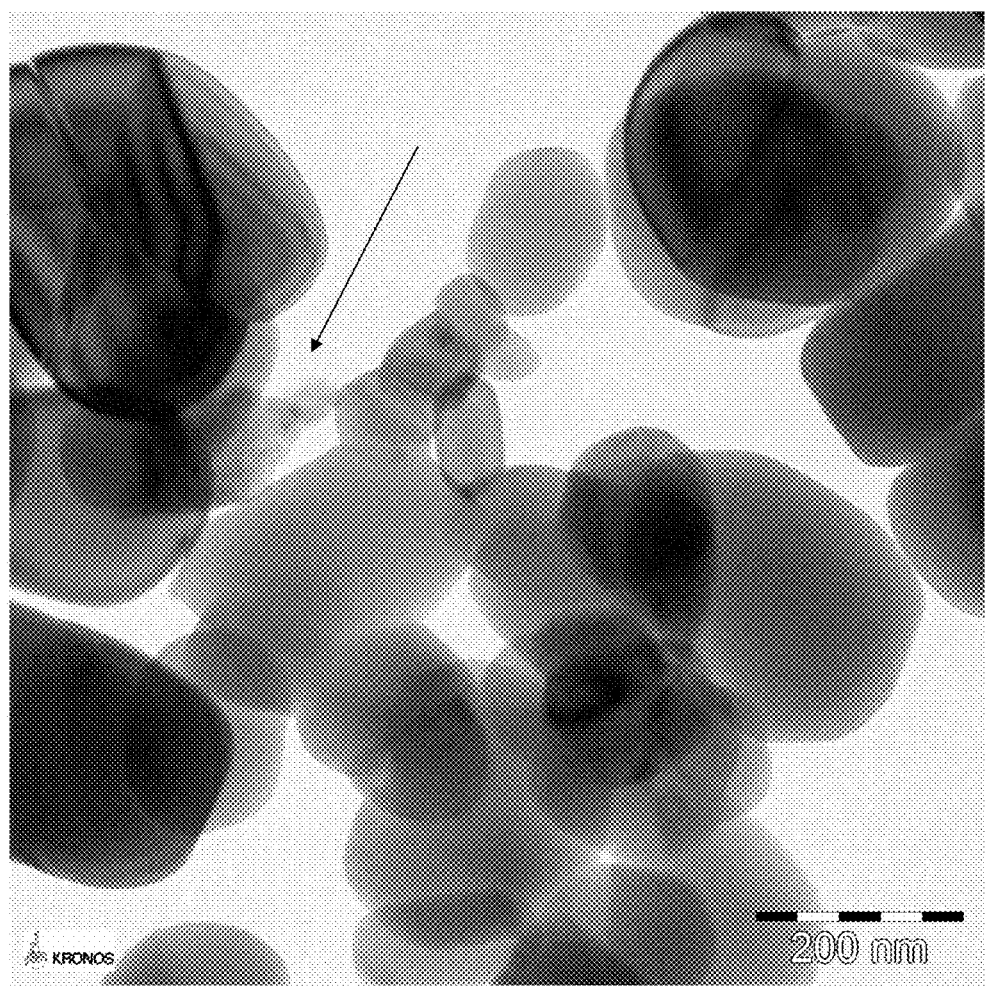
FIGS. 2a and 2b show TEM images of $TiO_2$ pigment particles surface-treated according to the invention, produced in accordance with Example 1.
Figure 2:
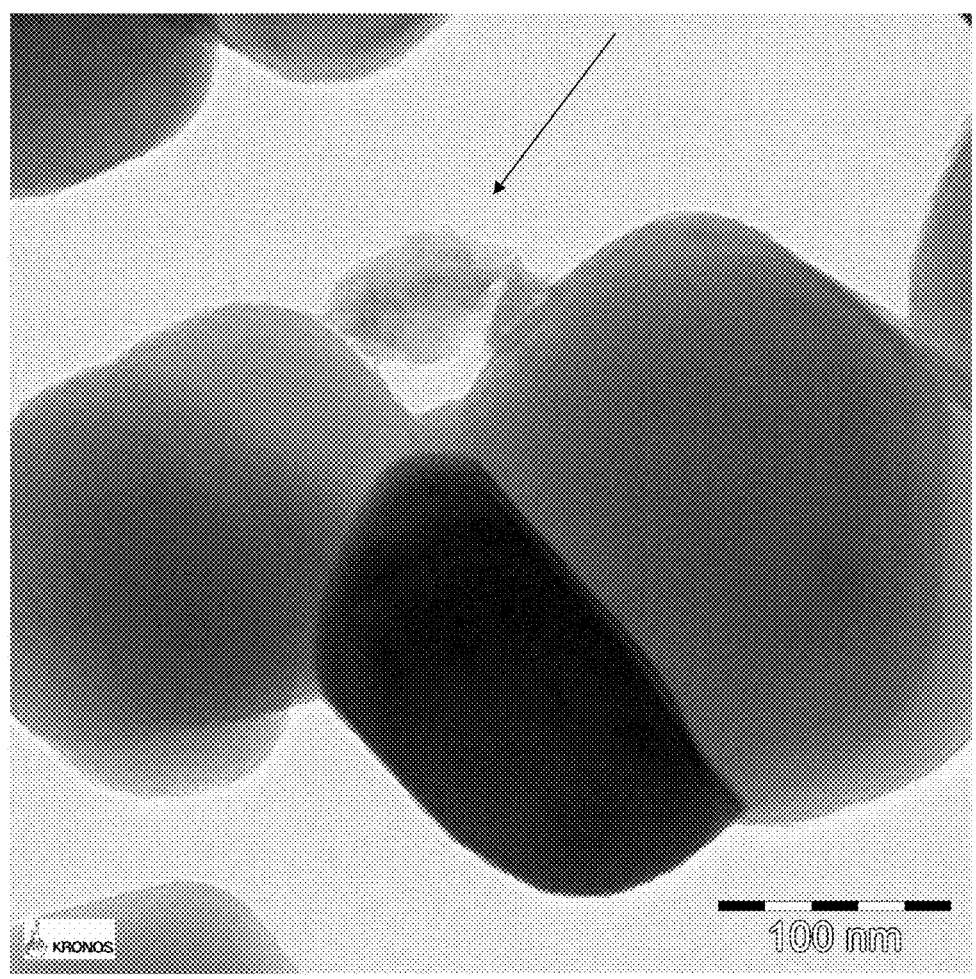

According to the invention, the agglomerates of the precipitation product are adsorbed on the inorganic pigment particles or between the inorganic pigment particles in the form of discrete flocs (see FIG. 2). In contrast, a largely continuous layer is formed on the particle surface during the conventional surface treatment of particles by in-situ precipitation of the inorganic materials on the particle surface (see FIG. 3).

Compared to conventional surface treatment, surface treatment according to the invention particularly permits better spacing of the individual pigment particles and thus improved efficiency in terms of opacity, tinting strength and cost. Moreover, surface treatment according to the invention leads to degrees of freedom when precipitating the inorganic compounds, since the pigment particles do not have to be exposed to special precipitation conditions, as with conventional in-situ precipitation.

In a special embodiment of the method according to the invention, a titanium dioxide pigment for use in laminates of high opacity and high greying resistance is produced. In this context, a layer of aluminum-phosphorus compounds is first deposited on the titanium dioxide particle surface, in a mixture with hydrous aluminum oxide, where appropriate. The composition is dependent on the quantities of the aluminum and phosphorus components used, and the quantity of doped $Al_2O_3$ possibly present. For simplicity, this layer is referred to as the aluminum oxide-phosphate layer below. The aluminum oxide-phosphate layer is produced as follows:

Phosphoric acid and an alkaline aluminum compound are first added to an aqueous suspension of preferably untreated titanium dioxide particles with a pH value of at least 8, preferably at least 9, followed by an acid aluminum compound, in which context a pH value of 4.5 to 7 is obtained and an aluminum oxide-phosphate layer is formed.

Subsequently, an aqueous mixed solution of at least two components with a pH value of 4.5 to 7 is prepared in a separate vessel in one step. The at least two components comprise either an alkaline aluminum compound (e.g. sodium aluminate) and an acid component, e.g. an acid or an acid-reacting salt (e.g. aluminum sulphate), or they alternatively comprise an acid aluminum compound (e.g. aluminum sulphate) and an alkaline component, e.g. an alkaline solution or an alkaline-reacting salt (e.g. sodium aluminate).

Inorganic aluminum compounds, particularly aluminum oxide, are precipitated in the mixed solution in the form of agglomerates of fine primary particles. The agglomerates preferably display a fluffy structure.

The mixed solution with the precipitated agglomerates is subsequently added to the titanium dioxide suspension, in which context the precipitated agglomerates are adsorbed on the surface of the titanium dioxide particles as flocs.

Finally, the pH value of the titanium dioxide suspension is set to roughly 5 to 7, as necessary.

The quantity of phosphoric acid used is preferably 1.0 to 5.0% by weight, particularly 1.5 to 3.5% by weight and particularly preferably 2.0 to 3.0% by weight, calculated as $P_2O_5$ and referred to $TiO_2$.

The total quantity of aluminum compounds added, including the precipitated agglomerates, is preferably 3.0 to 7.0% by weight, particularly 4.0 to 6.0% by weight, calculated as $Al_2O_3$ and referred to $TiO_2$.

The post-treated $TiO_2$ pigment is separated from the suspension by filtration methods familiar to the person skilled in the art, the resultant filter cake being washed in order to remove the soluble salts.

To improve the light-fastness of the pigment in the laminate, a nitrate-containing compound, e.g. $KNO_3$, $NaNO_3$, $Al(NO_3)_3$, can be added to the washed filter cake in a quantity of 0.05 to 0.5% by weight, calculated as $NO_3$ and referred to pigment, before or during the subsequent drying step. Furthermore, to improve the flow properties, an organic compound can be added to the pigment in one of the process steps, said compound being selected from those that are customarily used in the manufacture of $TiO_2$ pigments and familiar to the person skilled in the art, e.g. polyalcohols (trimethylolethane, trimethylolpropane, neopentyl glycol). As an alternative to addition of the nitrate-containing compounds before or during drying, substances of this kind can also be added during milling.

In an alternative embodiment of the method, the treated pigment is subjected to heat treatment at 200 to 400° C., preferably 200 to 300° C., for roughly 60 to 180 minutes.

Compared to the reference pigments, the pigment manufactured by this embodiment of the method according to the invention demonstrates improved opacity, while retaining equally good brightness and greying resistance, and is optimally suited to use in decorative laminating paper.

EXAMPLES

An example of the invention is described below, although this is not to be interpreted as a limitation of the invention.

Example 1

250 ml of a wet-milled $TiO_2$ pigment particle suspension displaying a $TiO_2$ concentration of 400 g/l were set to a pH value of 3 with $H_2SO_4$. 2 g $Al_2O_3$ were subsequently added in the form of an aluminum sulphate solution, as a result of which a pH value of below 3 was obtained.

To prepare the precipitation products from aqueous solution, 100 ml of a waterglass solution (100 g/l $SiO_2$) were slowly added to 100 ml of a sodium aluminate solution that had been set to a concentration of 100 g/l $Al_2O_3$ by means of 5% NaOH, at a temperature of 60° C. and while stirring. This was followed by slow lowering of the pH value to 10 by means of HCl and stirring for 24 hours at room temperature. A fine precipitate was formed.

FIGS. 1a and 1b show two transmission electron microscope (TEM) images of the precipitation product. The precipitation product consists of agglomerated, predominantly crystalline particles, displaying pronounced crystal faces and primary particle sizes both below 100 nm and above 100 nm. FIG. 1a additionally shows a single crystal with an edge length of approx. 300 nm.

40 ml of the suspension containing the precipitation products were then added to the $TiO_2$ suspension while stirring. The pH value of the $TiO_2$ suspension was subsequently set to between 6 and 8, and the $TiO_2$ particles were separated, washed and dried at 105° C.

FIGS. 2a and 2b show two TEM images of the treated TiO2 pigment particles. The images show that the precipitated agglomerates act as discrete spacers between the $TiO_2$ particles.

The specific surface area (BET) of the treated pigment particles was 9.2 m²/g.

Reference Example 1

20 ml waterglass solution (100 g/l $SiO_2$) and 20 ml aluminum sulphate solution (100 g/l $Al_2O_3$) were simultaneously added, at 60° C., to 250 ml of a wet-milled $TiO_2$ pigment particle suspension with a $TiO_2$ concentration of 400 g/l and a pH value of roughly 12.2 g $Al_2O_3$ were subsequently added in the form of an aluminum sulphate solution.

The pH value of the suspension was then set to 7, and the $TiO_2$ particles were separated, washed and dried at 105° C.

Figure 3:
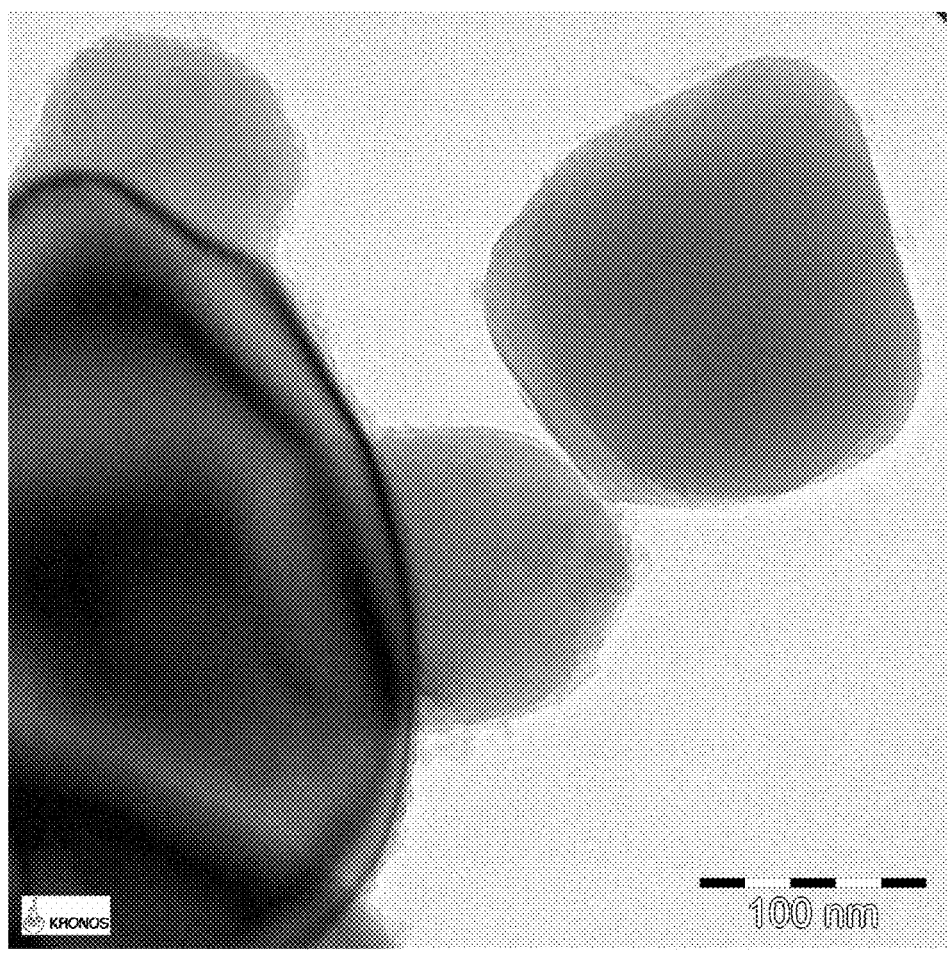
FIG. 3 shows a TEM image of conventionally surface-treated $TiO_2$ pigment particles, produced in accordance with Reference Example 1.

FIG. 3 shows a TEM image of the treated $TiO_2$ pigment particles. The image shows that the oxides precipitated in situ are present on the surface of the $TiO_2$ particles in the form of an almost continuous layer.

The specific surface area (BET) of the treated pigment particles was 15.3 $m^2/g$.

Example 2

2.5% by weight P2O5 in the form of 75% $H_3PO_4$ was added to a wet-milled $TiO_2$ pigment particle suspension from the chloride process with a $TiO_2$ concentration of 450 g/l, aluminum doping of the $TiO_2$ particles corresponding to 1.2% by weight $Al_2O_3$, and a pH value of 10. A pH value of roughly 2 was obtained in this context. 2.0% by weight $Al_2O_3$ was subsequently added in the form of sodium aluminate. A pH value of roughly 10 was obtained as a result. In the next step, the suspension was then set to a pH value of 5 by adding aluminum sulphate (corresponding to 1.1 to 1.3% by weight $Al_2O_3$).

An aqueous mixed solution of the components aluminum sulphate and sodium aluminate with a pH value of 5 was subsequently prepared, in which a precipitation product consisting of agglomerated primary particles formed. The mixed solution containing the precipitation product was added to the $TiO_2$ suspension in a quantity corresponding to an added quantity of 1.2% by weight $Al_2O_3$, referred to $TiO_2$.

The suspension was subsequently set to a pH value of 6 with the help of an alkaline sodium aluminate solution.

The post-treated TiO2 suspension was filtered and then washed to remove the water-soluble salts. Following the addition of roughly 0.18% by weight $NO_3$ in the form of NaNO3, the washed filter paste was dried in a spray drier and subsequently milled in a jet mill.

The manufactured pigment displayed the following composition, expressed in the form of the respective oxides: 2.2% by weight $P_2O_5$ and 5.1% by weight $Al_2O_3$, each referred to the $TiO_2$ base material, and 0.17% by weight $NO_3$.

Reference Example 2

2.5% by weight $P_2O_5$ in the form of 75% $H_3PO_4$ was added to a wet-milled $TiO_2$ pigment particle suspension from the chloride process with a $TiO_2$ concentration of 450 g/l, aluminum doping of the $TiO_2$ particles corresponding to 1.2% by weight $Al_2O_3$, and a pH value of 10. A pH value of roughly 2 was obtained in this context. 2.0% by weight $Al_2O_3$ was subsequently added in the form of sodium aluminate. A pH value of roughly 10 was obtained as a result. In the next step, the suspension was then set to a pH value of 5 by adding aluminum sulphate (corresponding to 1.1 to 1.3% by weight $Al_2O_3$).

1.2% by weight $Al_2O_3$ was subsequently admixed by parallel addition of aluminum sulphate and sodium aluminate solution, such that the pH value was maintained at 5 (fixed-pH method). The suspension was subsequently set to a pH value of 6 with the help of an alkaline sodium aluminate solution.

The post-treated $TiO_2$ suspension was filtered and then washed to remove the water-soluble salts. Following the addition of roughly 0.18% by weight $NO_3$ in the form of $NaNO_3$, the washed filter paste was dried in a spray drier and subsequently milled in a jet mill.

The manufactured pigment displayed the following composition, expressed in the form of the respective oxides: 2.3% by weight $P_2O_5$ and 5.5% by weight $Al_2O_3$, each referred to the $TiO_2$ base material, and 0.18% by weight $NO_3$.

Test Methods and Test Results

Laminate Production (Laboratory Scale)

The titanium dioxide pigments manufactured according to Example 2 and Reference Example 2 were processed into decorative laminating paper with pulp and subsequently tested as regards their optical properties and light-fastness in pressed laminates. To this end, the titanium dioxide pigment to be tested was incorporated into pulp, and sheets with a sheet weight of roughly 80 g/m2 and a $TiO_2$ content by mass of roughly 30 $g/m^2$ were produced.

For assessing the optical properties of the decorative laminating papers, and thus the quality of the titanium dioxide pigment, it is important to compare decorative laminating papers with identical ash contents. This makes it necessary for the quantity of titanium dioxide pigment used for forming the sheet to be adapted, in accordance with the retention, to the required $TiO_2$ content by mass in the paper, 30+1 $g/m^2$ in this case, or the required grammage, 80+1 $g/m^2$ in this case. In these tests, 1.65 g pulp (oven-dry) was taken as the basis for the formation of a sheet. The procedure and the auxiliaries used are familiar to the person skilled in the art.

The titanium dioxide content (ash in [%]) of a sheet was subsequently determined. The titanium dioxide content was determined by incinerating a defined weight of the produced paper in a rapid incinerator at 900° C. The $TiO_2$ content by mass (ash in [%]) can be calculated by weighing the residue. The following formula was used as the basis for calculating the ash content:

$$\text{Ash content } [g/m^2] = (\text{Ash } [\%] \times \text{Grammage } [g/m^2])/100\ [\%].$$

The further processing of the paper encompassed its impregnation and pressing into laminates. The sheet to be impregnated with resin was completely immersed in a melamine resin solution, then drawn between two doctor blades to ensure application of a specific amount of resin and subsequently pre-condensed at 130° C. in a recirculating-air drying oven. The amount of resin applied was 110 to 140% of the weight of the sheet. The sheet had a residual moisture content of 5.7 to 6.2% by weight. The condensed sheets were combined into books with phenolic resin-impregnated core papers and white or black underlay paper.

The books for measuring the optical properties had the following structure: decorative laminating paper, white or black underlay paper, 6 sheets of core paper, white or black underlay paper, decorative laminating paper.

The books for determining the greying resistance had the following structure: decorative laminating paper, 5 sheets of core paper, white underlay paper.

The books were pressed for 300 seconds with the help of a Wickert Type 2742 laminating press at a temperature of 140° C. and a pressure of 90 bar.

Testing

The optical properties and the greying resistance of the laminates were measured using commercially available equipment (spectrophotometer, Xenotest weathering machine).

To assess the optical properties of laminates, the optical values (CIELAB L*, a*, b*) to DIN 6174 are measured with the help of the ELREPHO® 3300 colorimeter over white and black underlay paper.

The CIELAB optical value L* over white underlay paper (L*white) was used as a measure of the brightness.

The opacity is a measure of the light transmission of the paper. The following parameters were selected as a measure of the opacity of the laminates: CIELAB $L^*_{black}$, the brightness of the laminates measured over black underlay paper, and the opacity value L [%]=$Y_{black}/Y_{white} \times 100$, determined from the Y-value measured over black underlay paper ($Y_{black}$) and the Y-value measured over white underlay paper ($Y_{white}$). Both values, CIELAB $L^*_{black}$ and L [%], are standardised to an ash content of 30.0 g/m². To assess the greying resistance (light-fastness) of the titanium dioxide pigments, or the titanium dioxide pigment blends, the corresponding laminate samples are exposed in a XENOTEST® Alpha machine. The optical values CIELAB L*, a* and b* to DIN 6174 were measured before and after exposure in the XENOTEST® Alpha for a period of 96 hours. The light source is a xenon-arc lamp with a UV radiation intensity of 70 W/m². The temperature in the specimen chamber of the machine is 45° C., the relative humidity being 30%. The samples are turned round during exposure. Both $\Delta L^* = L^*_{before} - L^*_{after}$ and $\Delta E = ((\Delta L^*)^2 + (\Delta a^*)^2 + (\Delta b^*)^2)^{1/2}$ were stated as a measure of the greying resistance.

Test Results

The Table shows the test results for laminates produced with the pigment according to the invention (Example 2) and with a reference pigment (Reference Example 2). It can be seen that the laminate manufactured with the pigment according to the invention displays higher opacity and very similar brightness and greying resistance values in comparison with a laminate containing a pigment manufactured according to the prior art.

TABLE

| | Ash content | Opacity | | CIELAB | Greying resistance | |
|---|---|---|---|---|---|---|
| | [g/m³] | $L^*_{black}$ | L [%] | $L^*_{white}$ | $\Delta L^*$ | $\Delta E$ |
| Example 2 | 30.0 | 90.4 | 90.8 | 93.6 | −0.56 | 0.56 |
| Reference Example 2 | 29.9 | 90.2 | 90.4 | 93.6 | −0.56 | 0.57 |

The method according to the invention leads to a pigment with clearly different surface properties, compared to a conventionally post-treated pigment, as indicated by a comparison of FIGS. 2 and 3 and the corresponding specific surface area (BET) values. Compared to conventional surface treatment, surface treatment according to the invention particularly permits improved spacing of the individual pigment particles and thus improved efficiency in terms of opacity, tinting strength and cost.

Moreover, surface treatment according to the invention leads to degrees of freedom when precipitating the inorganic compounds, since the pigment particles do not have to be exposed to special precipitation conditions, as with conventional in-situ precipitation.

The above descriptions of certain embodiments are made for the purpose of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

What is claimed is:

1. A method for the surface treatment of inorganic pigment particles, comprising the steps of:
    a) providing an aqueous suspension of untreated titanium dioxide particles with a pH value of at least about 8;
    b) subsequently adding phosphoric acid and an alkaline aluminum compound;
    c) subsequently, adding an acid aluminum compound to obtain a pH value of from about 4.5 to about 7;
    d) preparing an aqueous solution having a pH of from about 4.5 to about 7 from at least one alkaline aluminum compound and an acid component, or from at least one acid aluminum compound and an alkaline component;
    e) precipitating a precipitation product comprising one or more inorganic aluminum compounds from the aqueous solution, where the precipitation product consists of agglomerates of fine primary particles and/or of single crystals,
    f) Addition of the precipitation product to the aqueous titanium dioxide suspension.

2. The method of claim 1 wherein the pH of the suspension of the untreated titanium dioxide particles is at least about 9.

3. The method of claim 1 wherein the precipitation product has a fluffy agglomerate structure.

4. The method of claim 1 further comprising the step of utilizing the resulting pigment particles in plastics, coatings or laminates.

5. The method of claim 1 where in the quantity of phosphoric acid used is from about 1 to about 5 weight percent calculated as $P_2O_5$ and referred to $TiO_2$.

6. The method of claim 1 wherein the total quantity of aluminum compounds added, including the precipitated agglomerates, is from about 3 to about 7 weight percent calculated as $Al_2O_3$ and referred to $TiO_2$.

7. The method of claim 1 further comprising the steps of:
    filtering the treated pigment to form a filter cake;
    adding a nitrate-containing compound to the filter cake in an amount of from about 0.05 to 0.5 weight percent calculated as $NO_3$ and referred to the pigment.

8. The method of claim 1 further comprising the step of subjecting the treated pigment to a heat treatment at from about 200 to about 400° C. for a period of time from about 60 to about 180 minutes.

* * * * *